3,239,434
DISTILLATION METHOD OF IMPROVING THE ODOR OF OXYGENATED ORGANIC SUBSTANCES
Elaine Theodora Delaune and John Cecil Winkler, Baton Rouge, La., assignors to Esso Research and Engineering Company, a corporation of Delaware
No Drawing. Filed Mar. 26, 1962, Ser. No. 182,637
7 Claims. (Cl. 203—65)

The present invention relates to a method of improving the odor of oxygenated compounds, especially lower molecular weight alcohols and ethers. More particularly, it concerns contacting an oxygenated chemical having an undesirable odor with an organic additive and distilling the mixture to recover the chemical essentially free of the additive.

Most alcohols, ethers and ketones made on a commercial scale have foreign odors which, depending on their strength and distastefulness, limit the end use of these oxygenated organic substances. For example, odor is an important characteristic in alcohols used in food and toilet articles. Likewise, ethers that might otherwise be utilized as anesthetics are frequently rejected on the basis of poor odor.

Considerable work has been carried out in the past in an attempt to make contaminated alcohols, ethers, etc., satisfactory for use in products wherein odor is a critical property. Fractional distillation methods have failed to accomplish the desired result because the contaminant is usually present in relatively small quantities and frequently boils in the same range as the oxygenated organic products. Efforts along other lines have similarly been unsuccessful in improving the odor quality of the above-mentioned chemicals.

It has now been discovered that small amounts of certain organic additives, to be described hereinafter, have a marked effect on the odor quality of oxygenated chemicals contaminated with odor imparting substances. The additive is usually contacted with the odorous chemical prior to or during the finishing step, i.e. the final distillation. One advantage of the present invention is that essentially none of the additive is present in the product and thus the treatment usually does not adversely affect any of the standard tests used by the various industries to determine the quality of the product.

The most effective additives are those that possess a phenol nucleus. Many of these phenolic additives have hydrocarbyl groups attached to the ortho, meta, or para positions of the aromatic ring. The following is a general structural formula for compounds belonging to the classes of chemicals that come within the purview of the invention:

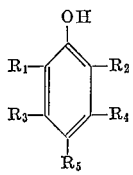

wherein $R_1$ to $R_4$ is hydrogen or an organic radical containing 1 to 16 carbon atoms selected from the group consisting of alkyl and alkoxy radicals, and $R_5$ is hydrogen or an organic radical having 1 to 16 carbon atoms selected from the group consisting of alkyl, alkoxy and aroxy radicals.

Among the phenolic compounds consisting exclusively of carbon, hydrogen and oxygen which can be used to improve the odor characteristic of organic oxygenated chemicals in accordance with the present invention are alkylated phenols such as 2,6-ditertiary-butyl-p-cresol, 2,4-ditertiary-butyl phenol, 2-methyl-4-tertiary-butyl phenol, 2,6-dimethyl phenol, and 2,4-ditertiary-butyl-6-methyl phenol; and bis-hydroxy phenol alkanes such as 4,4'-methylene-bis(2,6-ditertiary butyl phenol), 4,4'-bis(2,6-ditertiary-butyl phenol), 4,4'-methylene-bis(6-tertiary-butyl-O-cresol), 2,2'-methylene-bis(4-methyl-6-tertiary-butyl phenol), and 2,2'-bis(p-hydroxyphenol)propane.

Of the polyhydrocarbyl substituted compounds that can be utilized in practicing this invention, the lower alkyl substituted p-cresol compounds are preferred. These compounds can be represented by the following structural formula

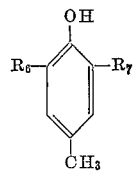

wherein $R_6$ and $R_7$ are alkyl groups having 1 to 5 carbon atoms, such as tert. butyl, methyl, isopropyl, n-butyl, sec. butyl and amyl. The substances in the other classes will significantly improve the odor of the product, but generally the effect is less.

In addition to the above phenolic additives, organic amino compounds can also be employed. Among the amino additives that can be used are aromatic hydroxy monoamino compounds, such as p-amino phenol, o-amino phenol, m-amino phenol, hydrocarbyl substituted phenols, such as methyl amino phenol, N-lauroyl-p-amino phenol, N-stearoyl-p-amino phenol, N-n-butyryl-p-amino phenol, N-n-pelargonyl-p-amino phenol, and monoamines, such as phenyl-alpha-naphthylamine, phenyl-beta-naphthylamine, diphenylamine, dioctyldiphenylamine and monooctyldiphenylamine.

The preferred aromatic hydroxy monoamino compounds can be represented by the following structural formula:

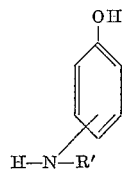

wherein R' is hydrogen or an alkyl group having 1 to 18 carbon atoms. The nitrogen atom is attached directly to a ring carbon atom in the ortho, meta or para position.

Another group of compounds that can be utilized to improve the odor of oxygenated organic products are organic sulfur compounds. Such compounds include lower alkyl metal thiocarbamates, such as cupric dimethyldithiocarbamate, sodium dimethyldithiocarbamate, zinc dibutyldithocarbamate and stannous diethyldithiocarbamate; and mercaptans having 6 to 22 carbon atoms, such as 4,4'-thiobis(6-tertiary-butyl-O-cresol) and thiophenol, B,B'-dithiodipropionic acid, thiopropionic acid, and dilauryl thiodipropionate.

The metal moiety in the alkyl thiocarbamates is preferably zinc, copper, tin or sodium.

Other additives that can be used in the present invention are lower molecular weight dibasic acids, such as oxalic acid, malonic acid, methyl malonic acid, succinic acid and methyl succinic acid. They may be used alone or in combination with any of the phenolic or amino phenolic additives.

Broadly speaking, the additives of the present invention are aromatic or saturated aliphatic compounds containing between 6 and 32 carbon atoms and having at least one functional group selected from the following: hydroxyl radicals, sulfur-containing radicals, amine radicals and carboxyl radicals. They preferably possess a higher boiling point than the oxygenated organic chemical or at least form a reaction product with the contaminant that boils above the boiling point of the product.

In carrying out the process of the present invention a small quantity of one or more of the above-mentioned organic additives is admixed with an alcohol, ether or ketone having a disagreeable, or otherwise undesirable odor, and the mixture is distilled to separate the product from the additive. The quantity of additive employed depends to a large extent on the amount and kind and odor and parting substances in the oxygenated chemical. For instance, if the odor is slight and it is merely intended to upgrade the quality of the finished product, as little as 0.1 p.p.m. (wt.) of the additive can be added to the crude alcohol, ether or ketone. On the other hand, it is sometimes necessary to use as much as 500 p.p.m. of the additive, based on the total composition of the oxygenated organic chemical-containing feed, in order to produce a satisfactory product. For most purposes it will be found that between about 0.5 and 10 p.p.m. (0.00005 to 0.0010 wt. percent) will substantially eliminate the foreign odors in the oxygenated organic liquid.

The odor improving agent can be contacted with the alcohol or other substance by adding the agent to the oxygenated organic chemical prior to or during the distillation of the chemical. Frequently it is advantageous to dissolve the additive in a portion of the liquid product in order to facilitate mixing and insuring a homogeneous product.

In a batch process, the additive can be dissolved in the contaminated material which is then distilled in a fractionating column or tower to recover the purified product substantially free of the additive. In a continuous process, the additive may be either continuously injected at the midpoint or upper part of the distillation tower or added to the oxygenated organic feed before it is introduced into the distillation zone. The manner of addition does not seem to significantly affect the beneficial results obtained from the treatment of the product with the additive, although treating the product with the additive concomitantly with the distillation operation is the preferred method.

The organic additives will effectively reduce the odor of the product even at room temperature. Thus, the agent may be added to the oxygenated organic chemical at substantially any temperature ranging from about 0° C. to the boiling point of the product. Likewise, pressure is not an important condition, however for economic reasons it is usually recommended to effect the treatment and separation at substantially atmospheric pressure. In some instances, it may be beneficial to carry out the distillation step at reduced pressure in order to avoid decomposition of the components in the mixture. Similarly, it may be advantageous to use superatmospheric pressure in some instances. Thus, the pressure in the distillation zone can range from as low as 1 or 10 mm. (absolute pressure) to as high as 250 p.s.i.g.

The improvement in odor quality is permanent and substantially instantaneous. In fact, in the case of some products, particularly isopropanol, even greater improvements are obtained by allowing the treated material to age for several months. Sometimes it may be beneficial to reflux the mixture for a short period, e.g. a few minutes to an hour, in order to provide adequate time for the additive to work. This is not necessary in most cases. One of the features of the invention is the elimination of any digestion or treatment time prior to the distillation step.

The oxygenated chemicals that can be improved by means of the present invention include essentially pure or dilute alcohols, ethers and ketones. While the use of these additives has application to the higher molecular weight products, they find their greatest use in the treatment of lower molecular weight liquids such as ethanol, isopropanol and diethyl ether. The oxygenated substances are generally aliphatic compounds that are either saturated or unsaturated. They can contain from 1 to 16 carbon atoms per molecule, and preferably contain 2 to 4 carbon atoms per molecule. Among the products that can be improved by the above-described treatment are primary or secondary monohydric, straight chain alcohols such as methanol, ethanol, isopropanol and secondary butanol that are made by hydrating petroleum olefinic hydrocarbons and other sources, e.g. fermentation; highly branched oxo alcohols such as decyl alcohol and isooctyl alcohol; synthetic ethers such as diethyl ether, divinyl ether, methyl ethyl ether and diisopropyl ether; and ketones such as methyl ethyl ketone, methyl isobutyl ketone and acetone.

The additives are effective in substantially reducing or eliminating the various foreign odors commonly associated with oxygenated organic products. For instance, in the case of alcohols made from olefins derived from a petroleum refinery stream, aldehyde, ketone, sulfur and butyl odors are frequently detected in the finished product. Some odors are incapable of being classified and are sometimes referred to as non-alcohol odors.

One method of evaluating the odor property of a product is to prepare standard samples having a graduated odor intensity that can be used to determine the strength of the odor in the oxygenated organic product. In one such method, the standard examples are assigned the values ranging from 1 to 12, with the highest number representing the sample having the strongest odor. In this test, a rating of "6" is considered "acceptable." This does not mean that the product can be used for all purposes since, obviously, some end uses require essentially odor-free raw materials. In such cases, the product can not have a rating greater than "2," and preferably "1," or in other words, substantially free of detectable foreign odor.

The following examples are given to provide a better understanding of the invention.

EXAMPLE 1

A small quantity (10 p.p.m.) of representative additives was added at ambient temperature to 95 vol. percent ethanol samples and the resulting mixtures were thereafter separately distilled in a 30 plate Oldershaw column at a reflux ratio of 5:1 following a 30 minute reflux period. Nine 10% overhead fractions and a 10% bottoms were recovered and evaluated for odor intensity and characteristic. The results are set forth in Table I.

Table I

| Additive | Odor rating | | | |
|---|---|---|---|---|
| | Control | N-lauroyl p-amino phenol | Zinc dibutyl dithiocarbamate | Oxalic acid |
| Cut: | | | | |
| 1 | 12A | 10A | 8A | 12A |
| 2 | 12A | 6A | 2G | 4A |
| 3 | 10A | 3A | 2G | 4A |
| 4 | 8A | 3A | 2G | 4A |
| 5 | 8A | 3A | 2G | 2G |
| 6 | 8A | 3A | 2G | 2G |
| 7 | 8A | 2G | 2G | 2G |
| 8 | 8A | 2G | 6A | 2G |
| 9 | 8A | 2G | 6A | 8A |
| Bottoms | 12HB | 12HB | 12A, Nontyp | 12HB, Nontyp. |

A=aldehyde odor. G=good, no foreign odor. HB=high boilers, nonalcohol odor. Nontyp.=unclassified odor.

The various fractions and the bottom portion of the mixtures were rated in accordance with the odor test described above. The data show that all three of the additives significantly improve the odor quality of the untreated ethanol. The overhead cut samples, i.e. cuts 1 to 9, were free of the additive.

EXAMPLE 2

Another additive, namely 2,6-ditertiary-butyl-p-cresol, was continuously injected at the rate of 10 p.p.m. near the top of the ethanol finishing towers in two different commercial units. Samples of the 95 vol. percent ethanol products, which were synthesized from ethylene via the sulfuric acid method, were evaluated for odor intensity and characteristic prior to injecting the additive. The product from tower 1 had an odor rating of "12+HB." A sample taken from the product of the overhead tower 1 approximately 24 hours later had an odor rating of "1G" while a sample taken after about 24 hours from the overhead product of tower 2 had an odor rating of "2A." Similar results were obtained when the additive concentration was increased to 20 p.p.m. on the finished alcohol.

EXAMPLE 3

Another series of runs was carried out with diethyl ether samples prepared by forming the sulfate ester of ethylene, hydrolyzing the reaction product and then separating the ether from the crude mixture. The samples were mixed with 100 p.p.m. of various additives and distilled in a 30 plate Oldershaw column at a reflux ratio of 5:1 following a 30 minute reflux period. An equal volume of water was added as a bottoms fraction. Ten percent overhead fractions were recovered and evaluated for odor content. The results are given in Table II.

*Table II*

| Additive | Control | N-lauroyl p-amino phenol | Zinc dibutyl dithiocarbamate | Oxalic acid |
|---|---|---|---|---|
| Cut: | | | | |
| 1 | 8A, no residual odor. | 1 good | 6HB, no residual odor. | 6A, no residual odor. |
| 2 | do | do | 3 Good | 1 Good. |
| 3 | 8HB, no residual odor. | do | do | Do. |
| 4 | do | do | 1 Good | Do. |
| 5 | do | do | do | Do. |
| 6 | do | do | do | Do. |
| 7 | do | do | do | Do. |
| 8 | do | do | do | Do. |
| 9 | do | do | do | 6HB, no residual odor. |
| 10 | do | do | 6HB, no residual odor. | Do. |

EXAMPLE 4

Example 3 was repeated with anhydrous ethanol (99.9 wt. percent) and 1 p.p.m. of 2,6-ditertiary butyl-p-cresol.

*Table III*

| | Odor rating | |
|---|---|---|
| | Control | Treated sample |
| Cut: | | |
| 1 | 12+A (sour) | 4A. |
| 2 | 12A | 3A. |
| 3 | 10A | 2 Good. |
| 4 | 8A | Do. |
| 5 | 8A | Do. |
| 6 | 6A | Do. |
| 7 | 6A | Do. |
| 8 | 8A | Do. |
| 9 | 8A | Do. |
| 10 | 12+HB ald | 12+HB ald. |

EXAMPLE 5

Example 3 was repeated with the exception that the diethyl ether was admixed with 10 p.p.m. of 2,6-ditertiary butyl-p-cresol.

*Table IV*

| | Odor rating | |
|---|---|---|
| | Control | Treated sample |
| Cut: | | |
| 1 | 8HB, no residual odor | 3 Good. |
| 2 | do | 2 Good. |
| 3 | do | 1 Good. |
| 4 | do | Do. |
| 5 | 6HB no residual odor | Do. |
| 6 | do | Do. |
| 7 | 8HB, no residual odor | Do. |
| 8 | do | Do. |
| 9 | do | Do. |
| 10 | do | Do. |

EXAMPLE 6

Example 3 was repeated using 10 p.p.m. of N-lauroyl-p-amino phenol as the additive.

*Table V*

| | Odor rating | |
|---|---|---|
| | Control | Treated sample |
| Cut: | | |
| 1 | 8HB, no residual odor | 6HB, no residual odor. |
| 2 | do | 1 Good. |
| 3 | do | Do. |
| 4 | do | Do. |
| 5 | 6HB, no residual odor | Do. |
| 6 | do | Do. |
| 7 | 8HB, no residual odor | Do. |
| 8 | do | Do. |
| 9 | do | Do. |
| 10 | 10HB, no residual odor | Do. |

EXAMPLE 7

The following runs demonstrate that it is not necessary to reflux the mixture prior to distillation in order to obtain satisfactory results. Isopropanol (91 vol. percent) was admixed with 10 p.p.m. of 2,6-ditertiary-butyl-p-cresol and distilled on a 30 plate Oldershaw column at a reflux ratio of 5:1 after a 30 minute reflux period. The results of this run are set forth in Table VI.

*Table VI*

| | Odor rating | |
|---|---|---|
| | Control | Treated sample |
| Cut: | | |
| 1 | 12HB | 3B. |
| 2 | 6HB | 2B. |
| 3 | 6HB | 2B. |
| 4 | 6HB | 2B. |
| 5 | 6HB | 2B. |
| 6 | 6HB | 2B. |
| 7 | 6HB | 2B. |
| 8 | 6HB | 2B. |
| 9 | 6HB | 2B. |
| 10 | 12HB, bottoms | 10HB, bottoms. |

When the same additive was incorporated in anhydrous isopropanol (99.9 wt. percent) and flash distilled with no reflux, the 10% fractions recovered had excellent odor properties. The data are given in Table VII.

Table VII

| Cut | Control | 1 p.p.m. of 2,6-dietertiary butyl-p-cresol | 10 p.p.m. of 2,6-dietertiary butyl-p-cresol |
|---|---|---|---|
| | | Odor rating | |
| 1 | 8HB | 1 Good | 1 Good. |
| 2 | 8HB | do | Do. |
| 3 | 8HB | do | D9o. |
| 4 | 8HB | do | Do. |
| 5 | 8HB | do | Do. |
| 6 | 8HB | do | Do. |
| 7 | 8HB | do | Do. |
| 8 | 8HB | do | Do. |
| 9 | 8HB | do | Do. |
| 10 | 12HB | 5 Butyl | 3 Butyl. |

EXAMPLE 8

A dilute solution of 2,6-ditertiary-butyl-p-cresol in diethyl ether (1.3 pounds per gallon) was added at the feed point of the dehydration column in a commercial diethyl ether unit at the rate of about 55 to 60 p.p.m. based on the ether product. The continuous addition of this additive caused the odor rating of the finished ether to decrease from "8HB" to "1 Good" in an hour and a half. When the addition was discontinued for about 2 hours the odor of the finished ether increase to "6HB," and when the addition was started again the odor rating once more fell to "1 Good" within several hours.

When this same additive solution was injected into another commercial unit at a point two-thirds of the way up the finishing distillation tower at the rate of 146 p.p.m. (on the ether product) the odor rating of the finished diethyl ether dropped from "8HB" to "1 Good" in about 3 hours.

EXAMPLE 9

A series of distillations was carried out with methyl ethyl ketone (MEK) having a strong aldehyde odor. Varying amounts of several additives were added to the MEK prior to distillation on a 30 plate Oldershaw column at a reflux ratio of 5:1 following a 30 minute reflux period. Ten percent overhead fractions were recovered and evaluated for odor content. The results are given in Table VIII.

*Table VIII.—Odor comparison of methyl ethyl ketone*

| | Fractions 1 to 10 |
|---|---|
| Control | Strong aldehyde odor. |
| 10 p.p.m. 2,6-dietertiary-butyl-p-cresol | Slight aldehyde odor. |
| 50 p.p.m. N-lauroyl-p-aminophenol | Moderate aldehyde odor. |
| 20 p.p.m. zinc dibutyldithiocarbamate | Do. |

Since there is no odor test for methyl ethyl ketone, the treated was compared to the untreated ketone on an intensity basis.

EXAMPLE 10

Ten p.p.m. 2,6-ditertiary-butyl-p-cresol is added to acetone and the mixture is distilled in 10% fractions as in Example 1. The data are given in Table IX.

*Table IX.—Odor comparison*

| Fraction | Control | 10 p.p.m. 2,6-ditertiary butyl-p-cresol |
|---|---|---|
| 1 | Strong aldehyde odor | Slight aldehyde odor. |
| 2 | do | Do. |
| 3 | do | Do. |
| 4 | do | Very slight aldehyde odor. |
| 5 | do | Do. |
| 6 | do | Do. |
| 7 | do | Do. |
| 8 | do | Do. |
| 9 | do | Do. |
| 10 | do | Strong aldehyde odor. |

Since there is no odor test for this product, the treated was compared with the untreated ketone.

EXAMPLE 11

200 p.p.m. of 2,6-dietertiary-butyl-p-cresol is added to crude diisopropyl ether and the mixture is distilled on a 30 plate Oldershaw column at a reflux ratio of 5:1 following a 30 minute reflux period. Water was added as a bottoms fraction. Four 25% fractions were recovered and evaluated for odor intensity and characteristic. Table X shows the results of this test.

*Table X.—Odor comparison*

| Fraction | Control | 200 p.p.m. ditertiary butyl-p-cresol |
|---|---|---|
| 1 | Strong characteristic odor | Slight characteristic odor. |
| 2 | do | Do. |
| 3 | do | Do. |
| 4 | do | Do. |

Treated lowered the intensity of the characteristic odor.

EXAMPLE 12

A major use of diisopropyl ether is in gasoline for octane number improvement. Unfavorable customer reaction to ether odor limits this use to about 2 vol. percent. Varying amounts of distilled diisopropyl ether (from Example 11) treated with 200 p.p.m. 2,6-ditertiary-butyl-p-cresol and untreated ether were added to gasoline and the ether odor level checked. The results of this test (Table XI) show that as much as 6 vol percent and possibly more could be added to gasoline.

*Table XI*

| | Blend | Ether odor level of blend |
|---|---|---|
| 1 | 2 vol. percent treated ether in gasoline | Very low. |
| 2 | 4 vol. percent treated ether in gasoline | Do. |
| 3 | 6 vol. percent treated ether in gasoline | Do. |
| 4 | 8 vol. percent treated ether in gasoline | Slight ether odor. |
| 5 | 10 vol. percent treated ether in gasoline | Do. |
| 6 | Blank—gasoline only | Very low. |
| 7 | 2 vol. percent untreated ether in gasoline | Do. |
| 8 | 4 vol. percent untreated ether in gasoline | Decided ether odor. |

EXAMPLE 13

Vinyl ether (anesthetic grade) was mixed with 200 p.p.m. 2,6-ditertiary-butyl-p-cresol and flash distilled (no plates) with water as bottoms. Four overhead fractions of 25 vol. percent were recovered and evaluated for odor content. These results are shown in Table XII.

*Table XII*

| Fractions | Control | 200 p.p.m. 2,6-ditertiary butyl p-cresol |
|---|---|---|
| | Odor rating | |
| 1 | 12+ Disagreeable HC, residual | 8 Agreeable, no residual. |
| 2 | do | Do. |
| 3 | do | Do. |
| 4 | do | Do. |

EXAMPLE 14

Decyl alcohol having a strong aldehyde odor was mixed with 300 p.p.m. 2,6-ditertiary-butyl-p-cresol and distilled in a 15 plate Oldershaw column at a 5:1 reflux ratio. Distillation pressure was 20 mm. Hg absolute. Ten percent overhead fractions were recovered and evaluated for odor content as shown in Table XIII.

Table XIII

| Fractions | Odor rating | |
|---|---|---|
| | Control | 300 p.p.m. 2,6-ditertiary butyl p-cresol |
| 1 | Strong aldehyde | Sweet, agreeable odor. |
| 2 | ----do---- | Do. |
| 3 | ----do---- | Do. |
| 4 | ----do---- | Do. |
| 5 | ----do---- | Do. |
| 6 | ----do---- | Do. |
| 7 | ----do---- | Do. |
| 8 | ----do---- | Do. |
| 9 | ----do---- | Do. |
| 10 (Btms.) | ----do---- | Aldehyde odor. |

It is not intended to restrict the present invention to the foregoing examples which are merely given to demonstrate some of the embodiments of the invention. It should only be limited to the appended claims in which it is intended to claim all of the novelty inherent in the invention as well as the modifications and equivalents coming within the scope and spirit of the invention.

What is claimed is:

1. Process for improving the odor of an aliphatic oxygenated substance selected from the group consisting of monohydric alcohols, ethers and ketones containing from 1 to 16 carbon atoms per molecule which comprises contacting said oxygenated organic substance having a foreign odor with a small amount, but not more than 500 p.p.m., of an organic additive having the structural formula

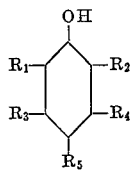

wherein $R_1$ to $R_4$ is selected from the group consisting of hydrogen, alkyl and alkoxy radicals containing 1 to 16 carbon atoms and $R_5$ is selected from the group consisting of hydrogen, alkyl, alkoxy and aroxy radicals containing 1 to 16 carbon atoms and subjecting the resultant mixture to distillation to recover the said oxygenated organic compound as the distillate of improved odor essentially free of the organic additive.

2. Process according to claim 1 in which the oxygenated compound treated for odor improvement contains 2 to 4 carbon atoms per molecule.

3. Process for improving the odor of an aliphatic oxygenated organic substance selected from the group consisting of monohydric alcohols, ethers and ketones of from 1 to 16 carbon atoms per molecule which comprises contacting the oxygenated organic substance having a foreign odor with a small amount, but not more than 500 p.p.m., of a polyhydrocarbyl-substituted phenol having the structural formula

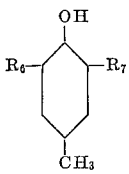

wherein $R_6$ and $R_7$ are alkyl groups containing 1 to 5 carbon atoms each and distilling the resultant mixture to recover said aliphatic oxygenated organic compound as the distillate of improved odor and essentially free of said phenol.

4. Process according to claim 3 in which the amount of polyhydrocarbyl-substituted phenol is about 0.1 to 10 p.p.m. based on the distilled oxygenated organic substance.

5. Process according to claim 3 in which said aliphatic oxygenated organic compound treated for odor improvement contains 2 to 4 carbon atoms per molecule.

6. Process according to claim 3 in which the polyhydrocarbyl-substituted phenol is 2,6-ditertiary butyl-p-cresol.

7. Process for improving the odor of a $C_2$ to $C_4$ aliphatic alcohol having an undesirable foreign odor which comprises contacting said alcohol with about 0.5 to 10 p.p.m. (wt.) of 2,6-ditertiary butyl-p-cresol while concomitantly distilling the alcohol to free it of said cresol.

References Cited by the Examiner
UNITED STATES PATENTS

| | | |
|---|---|---|
| 2,446,159 | 7/1948 | Mottern et al. |
| 2,467,846 | 4/1949 | Mottern et al. |
| 2,576,030 | 11/1951 | Morrell et al. |
| 2,631,970 | 3/1953 | Barnes. |
| 2,813,912 | 11/1957 | Gwynn et al. |
| 2,826,537 | 3/1958 | Sharp et al. |

NORMAN YUDKOFF, *Primary Examiner.*